United States Patent [19]

Manz

[11] Patent Number: 4,993,132
[45] Date of Patent: Feb. 19, 1991

[54] DEVICE FOR CONNECTING A TOOL TO A ROBOT ARM

[76] Inventor: Bernard Manz, Seestrasse 5, 7770 Überlingen, Fed. Rep. of Germany

[21] Appl. No.: 301,440

[22] Filed: Jan. 25, 1989

[30] Foreign Application Priority Data

Jan. 26, 1988 [DE] Fed. Rep. of Germany ....... 3802122

[51] Int. Cl.⁵ .......................... B23Q 3/155; H01R 4/64
[52] U.S. Cl. ..................................... 29/26 A; 409/233; 439/362; 901/41; 901/50; 279/8
[58] Field of Search ............... 29/26 A, 568; 409/233; 279/1 TS, 8; 439/359, 361, 362, 363; 901/41, 42, 50

[56] References Cited

U.S. PATENT DOCUMENTS 3,757,637 9/1973 Eich et al. ...................... 409/233 X
4,412,766 11/1983 Eckstein .............................. 409/233
4,525,918 7/1985 Puritz .............................. 29/26 A X
4,620,824 11/1986 Eckstein et al. .................... 409/233

FOREIGN PATENT DOCUMENTS 0112742 8/1980 Japan ............................... 279/1 TS Primary Examiner—Z. R. Bilinsky
Attorney, Agent, or Firm—Lee, Mann, Smith McWilliams & Sweeney

[57] ABSTRACT

A tool is to be automatically connected to a robot arm in well-defined angular position such that a sufficiently high torque is transmitted. The robot arm has a conical recess extending over a tool cone. A threaded sleeve is rectilinearly guided in the tool cone and displaceable with respect to a spring. A flange of the threaded sleeve engages an annular shoulder. A threaded spindle extending with a threaded head in a recess is mounted in the robot arm. The threaded spindle first pushes the threaded sleeve back against the action of the spring, such that the spindle engages the threaded sleeve with a well-defined force. Then the threaded head is screwed into the threaded sleeve and through the flange pulls the tool and the robot arm against each other by rectilinear movement. The conical surfaces and of the recess and the tool cone ensure the torque transmission.

9 Claims, 1 Drawing Sheet

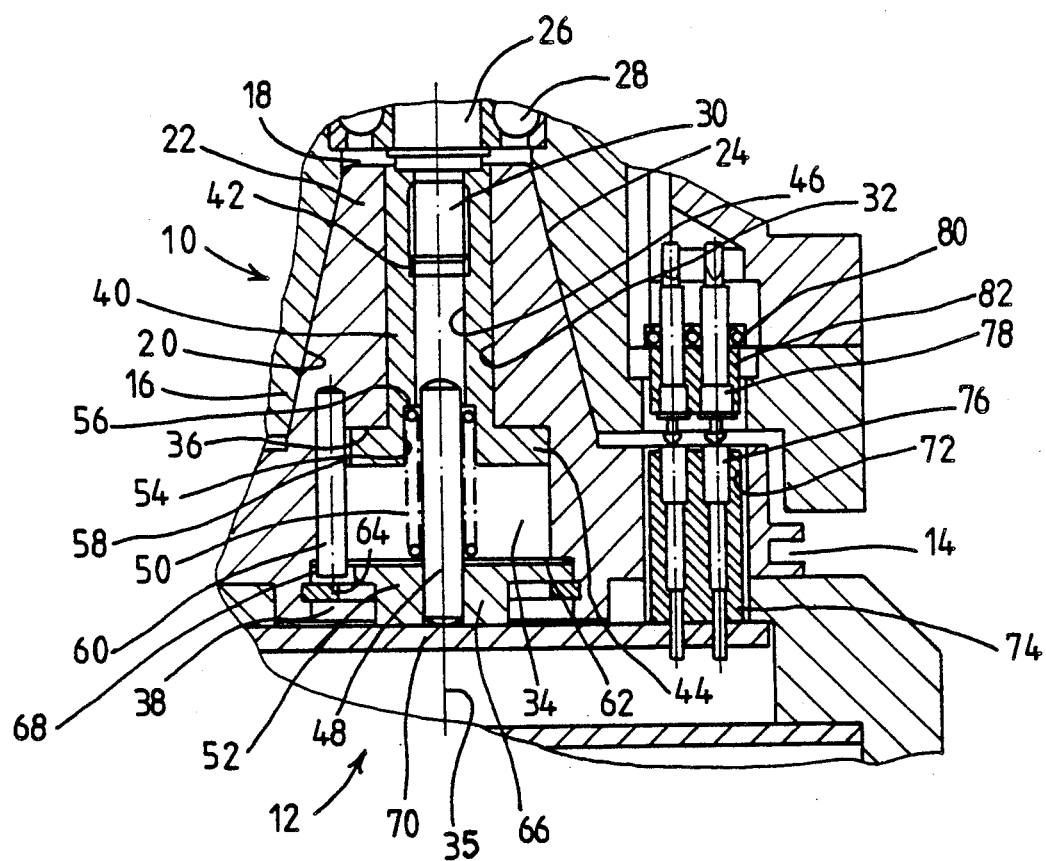

DEVICE FOR CONNECTING A TOOL TO A ROBOT ARM

TECHNICAL FIELD

The invention relates to a device for connecting a tool to a robot arm, wherein
(a) a recess provided at the robot arm and having a conical peripheral surface, and
(b) a tool cone attached to the tool and complementary to the peripheral surface of the recess.

BACKGROUND ART

French Patent No. 2,426,548 discloses a device for interchangeably attaching tools to an industrial robot, wherein a pot-shaped nut is provided on the rotatable end member of the robot. The nut is arranged to be screwed on a stationary threaded portion of the tool by means of the drive of the end member. At their peripheries, the threads of the nut and of the threaded portion are provided with longitudinal grooves. Thus the nut can be pushed axially over the threaded portion, the recesses of the nut extending over the remaining lands of the thread and vice versa. Then the nut is tightened on the threaded portion by rotation of the end member. The tool is supported on a resiliently retained tool support. A central centering pin having a frustro-conical, tapering end is provided on the threaded portion. The centering pin extends into a hub-like central portion of the nut. This central portion has a central bore therein which flares at its end facing the threaded portion.

European patent No. 0,120,275 discloses a tool carrier for engaging tools in industrial robots, wherein a cone is provided on the tool and a conical internal surface complementary thereto is provided on the robot arm. A central locking device serves to pull the cone against the conical inner surface.

The locking device comprises a central pin provided on the cone, this pin carrying a double conical head. A "double-acting jack" comprises a sleeve which slides in a stepped axial bore communicating with the conical inner surface. Balls are located in transverse bores of the sleeve. The sleeve is arranged to be shifted by a piston of the jack. This piston is arranged to be exposed to a control fluid pressure against the action of a spring. In a "lower" position of the piston, which the piston assumes, when it is exposed to the control fluid pressure, the balls are able to yield towards the larger diameter internal surface of the stepped bore. The pin with its double-conical head can be pushed into the sleeve. Thereby the balls are urged radially outwards. When the control fluid pressure is removed, the sleeve will move back under the action of the spring. Thereby the balls will be pushed inwardly by the inner wall of the narrower portion of the stepped bore and will lock the double-conical head. The cone of the tool is then pulled against the conical inner surface of the robot arm by the spring through the balls and the head.

DISCLOSURE OF THE INVENTION

It is the object of the invention to connect a tool in exactly defined angular position automatically to a robot arm such that the connection is able to transmit a sufficiently high torque.

According to the invention this object is achieved by
(c) a threaded spindle extending from the bottom of this recess into the recess, a program controlled spindle motor on the robot side being adapted to drive this threaded spindle, and
(d) a threaded sleeve axially movable in the tool cone and hold against rotation, said threaded sleeve engaging a stop under the action of a spring and being arranged to be pushed back in the cone tool while compressing the spring, the threaded spindle being arranged to be screwed into said sleeve.

The robot arm centers itself with respect to the tool through the conical surfaces of recess and tool cone. Then at first the threaded sleeve is pushed back by the threaded spindle against the action of the spring. This ensures that the threaded sleeve engages the threaded spindle with a well-defined force. The threaded spindle is then driven by the appropriately programmed spindle motor, whereby the threaded sleeve is pulled against the stop, and thereby the robot arm is then pulled against the tool firmly hold axially in a holding. Thereby the conical peripheral surface of the tool cone is pulled into the conical peripheral surface of the recess. Thereby a connection beween tool and robot arm is obtained, which is able to transmit even relatively large torques about the cone axis. Tool and robot arm maintain a well-defined relative position during this pulling process.

BRIEF DESCRIPTION OF THE DRAWING

An embodiment of the invention will now be described in further detail with reference to the accompanying drawing, which shows a longitudinal sectional view of the tool accommodation of the robot arm and the tool cone of the tool.

PREFERRED EMBODIMENT OF THE INVENTION

A robot arm is designated by 10 and a tool is designated by 12. The tool is hold in a tool holder (not shown) in well-defined position. It is hold against axial movement (vertical in the Figure) by a centering groove 14, but may be detached from the tool holder by a radial driving force. The robot arm 10 is moved with a tool accommodation 16 over the tool 12 with a well-defined orientation relative to the stationary tool 12, and is to be connected to the tool in this orientation.

Therefore a recess 18 having a conical peripheral surface 20 is provided in the tool accommodation 16. The tool 12 has a tool cone 22 the peripheral surface 24 of which is complementary to the conical peripheral surface 20 of the recess 18.

A threaded spindle 26 is mounted in ball bearings 28 in the robot arm 10 coaxially to the conical recess 18. The threaded spindle 26 has an externally threaded head 30. The threaded spindle may be driven by a spindle motor (not shown). The spindle motor is swiched on and off or reversed in accordance with a program of the robot.

A bore 32 is provided in the tool cone 22. The bore 32 is coaxial to the cone axis 35. The bore 32 is enlarged at its rear end, that is the end remote from the robot arm 10, to form a cylindrical chamber 34. An annular shoulder 36 is formed beween the bore 32 and the chamber 34. A flat cylindrical recess 38 coaxial to the chamber 34 communicates with the chamber 34 adjacent thereto.

A threaded sleeve 40 is axially displaceably guided in the bore 32. At its front end, that is the end facing the robot arm 10, the threaded sleeve 40 is internally threaded at 42. The internal thread 42 corresponds to the external thread of the threaded head 30 of the threaded spindle 26 such that the threaded spindle 26 with the threaded head 30 may be screwed in the internal thread 42 of the threaded sleeve 40. The threaded sleeve 40 has a flange 44 at its rear end. At its rear end the threaded sleeve 40 is provided with a smooth inner wall. A guiding pin 48 stationary with respect to the tool extends into the bore 46 of the threaded sleeve 40. The guiding pin is surrounded by a biased coil spring 50. The coil spring 50 is supported on a disc 52 stationary with respect to the tool and engages the threaded sleeve 40. At its rear end the threaded sleeve 40 has a recess 54 forming an annular shoulder 56. The end of the coil spring 50 engaging the annular shoulder 56 extends into this recess. In the state of rest the flange 44 is held by the coil spring 50 in engagement with the annular shoulder 36 forming a stop.

The flange 44 of the threaded sleeve 40 has a notch 58 at its rim. A pin 60 stationary with respect to the tool is fixed in the tool cone 22. The pin 60 extends along the inner wall of the chamber 34 parallel to the axis 35. The pin 60 engages the notch 58 at the rim of the flange 44. Thereby the threaded sleeve 40 is held against rotation.

An annular shoulder 62 is formed beween the chamber 34 and the flat recess 38. The disc 52 is guided, in the inner wall of the recess 38 and is held beween the annular shoulder 62 and a snap ring 64. The guiding pin 48 is centrally hold by press fit in the disc 52. To this end the disc 52 has a thickend central portion 66. The disc 52 has a notch 68 at the border. The pin 60 engages the notch 68.

The recess 38 is closed by a plate 70. Fixed contacts 76 are provided on the plate 70 lateral of the tool cone in a bore 72 and an insulating body 74 of the tool 12. Elastic contact pins 78 are provided on the robot arm 10 in a plate 80 and an insulating element 82. With correct connection of the tool 12 and the robot arm 10, the fixed contacts 76 and the elastic contact pins 78 are in alignment and engage one another with good electric contact.

The described arrangment operates as follows:

As mentioned above, the tool 12 is held in a tool holder in fixed position. The robot arm 10 is moved over the tool 12 with predetermined orientation by appropriate programming of the robot, and is placed with the recess 18 on the tool cone 22. Thereby the robot arm 10 is centered with respect to the tool 12 through the conical surfaces 20 and 24. The threaded spindle 26 is placed with its threaded head 30 on the front end of the threaded sleeve 40 (the upper one in the Figure). When the robot arm 10 is moved further forwards (downwards in the Figure), the threaded sleeve 40 with the flange 44 is lift from the annular shoulder 36 and is moved back. Thereby the biased coil spring 50 is compressed. The threaded spindle 26 thus engages the threaded sleeve 40 with a well-defined and limited force. Then the spindle motor is switched on. Thereby the threaded head 30 of the threaded spindle 26 is screwed into the internal thread 42 of the threaded sleeve 40. The threaded sleeve 40 is held against rotation by the pin 60. This causes the threaded sleeve 40 to be pulled forwards again, that is upwards in the Figure, until the flange 44 again engages the annular shoulder 36. Thereby the robot arm 10 is pulled with the conical peripheral surface 20 of the recess 18 on the peripheral surface of the tool cone 22 having a conical shape complementary thereto. This is effected by a purely straight movement such that the orientation of the tool 12 relative to the robot arm 10 is not modified. Thus the tool 12 can be attached to the robot arm 10 automatically, that is without intervention of the user. The attachment is such that also relatively large torques about the axis 35 may be transmitted.

The attachement in exactly defined relative positions permits electrical connections 12 to be established to the tool in the described manner through contacts 76 and elastic contact pins 78.

I claim:

1. Device for connecting a tool to a robot arm, comprising:
    (a) the robot arm (10) having a recess (18), the recess (18) having a conical peripheral surface (20), and
    (b) a tool cone (22) attached to the tool (12) and complementary to the peripheral surface (20) of the recess (18),
    (c) a motor-driven threaded spindle (26) extending from the bottom of the recess (18) into the recess (18), and
    (d) a threaded sleeve (40) being axially movable in the tool cone (22) and held against rotation, said threaded sleeve (40) engaging a stop means under the action of a spring (50) and capable of being pushed back in the tool cone (22) while compressing the spring (50), the threaded spindle (26) being thread-engageable into said threaded sleeve.

2. Device as set forth in claim 1, wherein the spring (50) is a coil spring, and further including a guiding pin (48) extending into the threaded sleeve (40), the spring (50) surrounding the guiding pin (48).

3. Device as set forth in claim 1, wherein:
    (a) the threaded sleeve (40) is guided in a bore (32) of the tool cone (22), said bore being enlarged at one end to form a chamber (34) of increased diameter, an annular shoulder (36) formed between said bore and said increased diameter chamber,
    (b) the threaded sleeve (40), at said one end, having a flange (44) movable in the chamber (34) and engaging the annular shoulder (36), said annular shoulder forming said stop means,
    (c) the flange (44) having a notch (58), and
    (d) a pin (60) stationary with respect to the tool being arranged parallel to the axis (35) of the threaded sleeve (40), the chamber (34) having an inner wall, the pin (60) being arranged along the inner wall of the chamber (34) and extending into the notch (58) of the flange (44) for holding the threaded sleeve (40) against rotation.

4. Device as set forth in claim 3, wherein:
    (a) the chamber (34) being further enlarged at said one end and forming a flat recess (38) having an inner wall, a second annular shoulder (62) being formed between said chamber (34) and said recess (38),
    (b) a disc (52) located in the flat recess (38) and guided in the inner wall of the recess (38), said disc (52) being held between a snap ring (64) and the second annular shoulder (62),
    (c) the guiding pin (48) being centrally held in the disc (52), and
    (d) the disc (52) having a notch (63) at its periphery, said notch (63) being engaged by the pin (60).

5. Device as set forth in claim 1, wherein the tool (12) being held in defined position in a tool accommodation means and the accommodation means holding the tool against axial movement, the tool being detachable from said tool accommodation means by radial driving forces.

6. Device as set forth in claim 5, wherein:
 (a) a plate (70) being attached to the tool (12), fixed contacts (76) being located on said plate laterally of the tool cone (22), and
 (b) elastic contact pins (78) being attached to the robot arm (10) for elastic engagement with the fixed contacts (76) when the robot arm (10) is pulled against the tool (12).

7. Device for connecting a tool to a robot arm, comprising:
 (a) the robot arm (10) having a recess (18), the recess (18) having a conical peripheral surface (20),
 (b) a tool cone (22) attached to the tool (12) and complementary to the peripheral surface (20) of the recess (18),
 (c) a motor-driven threaded spindle (26) extending from the bottom of the recess (18) into the recess (18),
 (d) a threaded sleeve (40) being axially movable in the tool cone (22) and held against rotation, said threaded sleeve (40) engaging a stop means under the action of a coil spring (50) and capable of being pushed back in the tool cone (22) while compressing the coil spring (50), the threaded spindle (26) being thread-engageable into said threaded sleeve, and
 (e) further including a guiding pin (48) extending into the threaded sleeve (40), the spring (50) surrounding the guiding pin (48).

8. Device as set forth in claim 7, wherein:
 (a) the threaded sleeve (40) is guided in a bore (32) of the tool cone (22), said bore being enlarged at one end to form a chamber (34) of increased diameter, an annular shoulder (36) being formed between said bore and said increased diameter chamber,
 (b) the threaded sleeve (40), at said one end, having a flange (44) movable in the chamber (34) and engaging the annular shoulder (36), said annular shoulder forming said stop means,
 (c) the flange (44) having a notch (58), and
 (d) a pin (60) stationary with respect to the tool being arranged parallel to the axis (35) of the threaded sleeve (40), the chamber (34) having an inner wall, the pin (60) being arranged along the inner wall of the chamber (34) and extending into the notch (58) of the flange (44) for holding the threaded sleeve (40) against rotation.

9. Device as set forth in claim 8, wherein:
 (a) the chamber (34) being further enlarged at said one end and forming a flat recess (38) having an inner wall, a second annular shoulder (62) being formed between said chamber (34) and said recess (38),
 (b) a disc (52) located in the flat recess (38) and guided in the inner wall of the recess (38), said disc (52) being held between a snap ring (64) and the second annular shoulder (62),
 (c) the guiding pin (48) being centrally held in the disc (52), and
 (d) the disc (52) having a notch (63) at its periphery, said notch (63) being engaged by the pin (60).

* * * * *